United States Patent [19]

Gramer et al.

[11] 4,194,497
[45] Mar. 25, 1980

[54] METHOD AND APPARATUS FOR INSTALLING SOLAR COLLECTOR PANELS

[76] Inventors: Eben J. Gramer, 5441 E. Nassau Cir., Englewood, Colo. 80110; William E. Kugler, 2989 S. Detroit Way, Denver, Colo. 80210

[21] Appl. No.: 908,962

[22] Filed: May 24, 1978

[51] Int. Cl.² .............................................. F24J 3/02
[52] U.S. Cl. .................................... 126/432; 126/417
[58] Field of Search .................. 126/270, 271; 165/53, 165/76, 171, 485; 285/45, 47, 49, 53; 52/747, 748, 746

[56] References Cited
U.S. PATENT DOCUMENTS

| 3,511,011 | 5/1970 | Straus | 52/748 |
| 3,707,821 | 1/1973 | Leddy | 52/748 |
| 3,937,208 | 2/1976 | Katz et al. | 126/271 |
| 3,965,887 | 6/1976 | Grammer et al. | 126/444 |
| 3,995,804 | 12/1976 | Folds et al. | 126/432 |
| 3,996,918 | 12/1976 | Quick | 126/432 |
| 4,000,850 | 1/1977 | Diggs | 126/271 |
| 4,010,733 | 3/1977 | Moore | 126/271 |
| 4,034,738 | 7/1977 | Barber, Jr. | 126/428 |
| 4,144,874 | 3/1979 | Zebuhr | 126/271 |
| 4,155,346 | 5/1979 | Aresty | 126/271 |

FOREIGN PATENT DOCUMENTS

7610587  3/1977  Netherlands ............................ 126/271

Primary Examiner—James C. Yeung
Assistant Examiner—Larry Jones
Attorney, Agent, or Firm—Burton & Dorr

[57] ABSTRACT

A method for installing solar collector panels as part of the roof of a building. Chalk lines are scribed on the roof to define the center of each vertical roof joist and to define the upper and lower extremes of the roof over which the solar collector panels are to be mounted. Upper and lower mounting brackets are aligned along the upper and lower horizontal scribed chalk lines and are attached through the roof to the joists as determined by the vertical chalk lines. Vertical rails are then mounted between the upper and lower brackets, aligned over the vertically scribed lines and mounted to the joists. One or a plurality of the solar collector panels are then installed between the vertical rails and between the upper and lower brackets. Cover and weather sealing plates are then installed to protect the mounting system and the solar collector panels from the environment.

9 Claims, 29 Drawing Figures

METHOD AND APPARATUS FOR INSTALLING SOLAR COLLECTOR PANELS

BACKGROUND OF THE INVENTION

1. Field of the Invention

The invention relates to the installation of solar collector panels to the roof of a building and, more particularly, the installation of solar collector panels as part of the roof of the building.

2. Discussion of the Prior Art

Recently, the emphasis for energy production has turned, in the passive mode, to collection of solar heat. There has been and is much research in the design of solar collectors and numerous configurations and arrangements for solar collector panels have been generated.

An example of a novel solar collector panel is that by the Inventor entitled "Solar Collector and System for Mounting A Plurality of Solar Collectors On A Surface," Ser. No. 814,080, Filed July 8, 1977 (hereinafter termed "Referenced Solar Panels").

While significant research and development has been accomplished towards the development of inexpensive solar collector panels, a major obstacle to the economical use of solar power has been in the exorbitant cost of installation. It has been observed by the Inventor that considerable training is required for installers of each different type of solar collector panel. This obstacle becomes compounded when different solar collector panels require different installation procedures and techniques.

Another problem encountered by prior art approaches, also due in part to the problems encountered by the installer, relates to the numerous leaks that arise immediately after the installation of solar collectors on the roof of a building. Often, it becomes costly, at a later date, to reinstall or to otherwise repair a mounted solar collector system to avoid water leakage through the roof.

Another problem encountered in the installation of solar collector panels on the roof of a building, primarily in the great plains area of the United States is the damage done to solar collector panels by high wind. Such damage generally requires the complete reinstallation of a new solar collector system.

The Inventor witnessing such problems substantially minimized the complexity of installation, the probability of water leakage and the concern for wind damage through application of the present invention. The present invention seeks to incorporate solar collector panels as part of the roofing material to be utilized in the roof of a building. This differs from conventional approaches where the solar collector panels are mounted on or over the roofing material. The present invention sets forth a simplistic approach for the installation of solar collector panels—an approach that can be readily taught to an inexperienced installer. And, the present invention uses the support joists of a roof as the primary affixation points for the solar collector system.

By using the installation techniques set forth herein, an installer can readily scribe, with chalk, the tar paper on a roof to allocate and to position the solar collector panels between the support joists of the roof so that the upper and lower mounting brackets, as well as the center rails between the solar collector panels, are directly positioned over the support joists.

The net result by using the teachings of the present invention results in a solar collector system that forms an integral part of the roof, that is firmly attached to the joists of the roof, thereby substantially increases the strength of the solar collector system in being attached to the roof, and thereby minimizes water leaks and the like. Furthermore, certain techniques are disclosed wherein cover and ceiling plates are used to protect the mounting bracket and the coupling points from the elements.

SUMMARY OF THE INVENTION

A novel method and apparatus for installing solar collector panels as part of the roof of a building is disclosed wherein the roof comprising plywood conventionally affixed over support joists which are spaced at predetermined intervals and wherein the plywood is covered with tar paper is first scribed with chalk lines to define the outer perimeter of the solar collector panels and to define the center of each support joist.

Based upon the scribed chalk pattern, an installer first installs a lower support system including a support bracket aligned along the lower horizontal chalk line and a manifold, having outwardly extending ports upwardly oriented and aligned with the center line between the support joists, placed over the support bracket.

The installer thereupon installs the upper support system which includes, likewise, a support bracket oriented along the upper horizontal chalk line and a manifold with downwardly extending ports. If two installers are available to install the solar collector panels on the roof, one installer can be installing the lower support system while the second installer can be installing the upper support system.

Guide rails are then installed over the vertically scribed chalk lines between the upper and lower support systems along the vertically scribed lines which define the center of the support joists. The solar collector panels are then installed, row by row, between the vertical rails and between the upper and lower support systems.

In another aspect of the present invention, a manifold is set forth which includes a plurality of outwardly extending ports which engage each row of the solar collector panels and which includes opposing side ports on each end of the manifold for selective coupling to an adjacent manifold. In this fashion, the manifold can be adapted to any desired horizontal length to engage any number of rows of solar collector panels.

OBJECTS OF THE INVENTION

It is therefore an object of the present invention to provide a novel method for installing solar collector panels as part of the roof of the building.

It is still another object of the present invention to provide a novel method for installing solar collector panels on the roof of a building in which the installation results in a minimum of water leakage.

It is still another object of the present invention to provide a novel method for installing solar collector panels on the roof of a building in which the upper and lower mounting brackets for the solar collector panels are mounted to the support joists of the roof.

It is still another object of the present invention to provide a novel method of installation of solar collector panels on the roof of a building which is simple and straight forward in application for training installers.

It is still another object of the present invention to provide a new and novel method for installing solar collector panels as part of the roof of a building which comprises the steps of scribing chalk lines on tar paper covered plywood over the support joists of a roof to define the center of each vertical roof joist and to define the upper and lower horizontal ends of the panel, the placing of a lower support bracket aligned along the lower chalk line, the aligning of the affixation holes of the lower support bracket with the vertical chalk lines corresponding to the roof joists, the affixing of the lower support bracket through the affixation holes to the roof joists and to the roof, the placing of the upper support brackets aligned with the upper chalk lines, the aligning of the affixation holes of the upper support bracket with the vertical chalk lines, and the affixation of the upper support brackets to the affixation holes to the support joists and the roof.

It is another object of the present invention to provide a novel apparatus for installing solar collector panels as part of the roof of a building having upper and lower mounting brackets wherein each of the brackets has a plurality of formed affixation holes being spaced to align with the center of the support joists of the roof, means engaging the affixation holes of the mounting brackets for firmly attaching the upper and lower brackets, at predetermined distances from each other, through the tar paper on the roof to the joists, means for inserting one or a plurality of the solar collector panels between the upper and lower brackets, and means for sealing the junction of the panels with the brackets from the environment.

It is another object of the present invention to provide a novel manifold for interconnecting a plurality of solar collector panels in fluid communication.

Other objects, advantages and capabilities of the present invention will become more apparent as the description proceeds, taken in conjunction with the accompanying drawings.

Figures 1, 2:
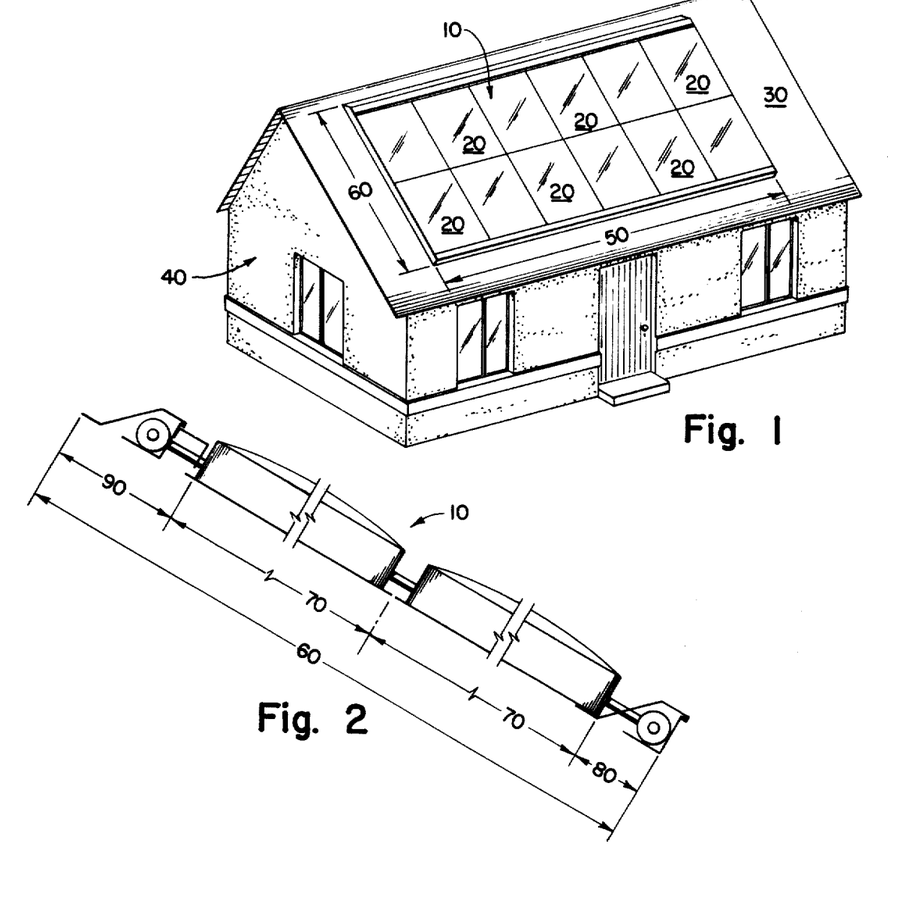
FIG. 1 is an illustration showing solar collector panels installed, by the method and apparatus of the present invention, as part of the roofing material for a building.
FIG. 2 sets forth the various distance relationships between the several components of the apparatus of the present invention.

In FIG. 1 is shown the installation system 10 of the present invention supporting a plurality of solar collector panels 20 mounted as part of the roof 30 of a building 40. The installation apparatus 10 of the present invention enables the solar collector panels 20 to be an integral part of the roof 30. Furthermore, the installation apparatus 10 of the present invention substantially minimizes water leaks and the like from occurring through the roof 30 into the building 40 while providing a structure for substantially strengthening the mounting of the solar collector panels to the roof.

The installation apparatus 10 of the present invention, as shown in FIG. 1, occupies an area defined by a horizontal length 50 and a vertical length 60.

FIG. 2 sets forth the various component lengths of the vertical distance 60 to include the length of the solar collector panels 70, the length of a lower mounting bracket 80, and the length of an upper mounting bracket 90.

Figure 3:
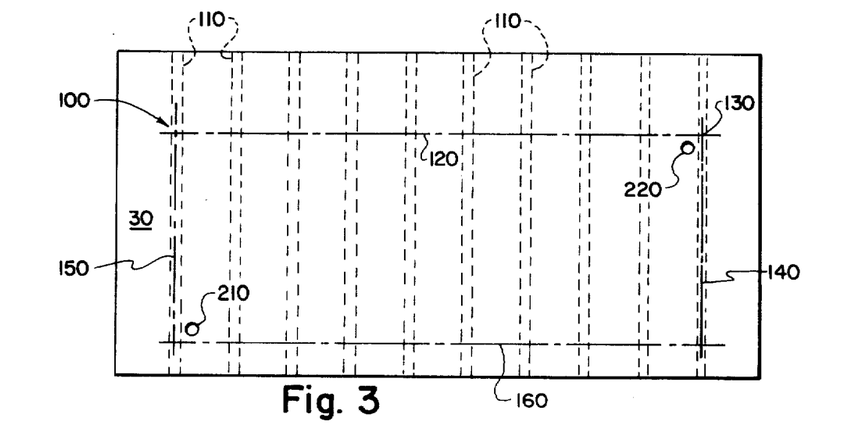
FIG. 3 sets forth the scribing of the horizontal upper and lower chalk lines on the tar paper of the roof of the building.

The first step in utilizing the installation apparatus 10 of the present invention is to determine the dimensions 50 and 60 which, of course, are based on the dimensions of the solar collector panels. Once these dimensions are ascertained, the roof 30 is scribed with chalk as shown in FIG. 3. A corner 100 is ascertained directly in the center of a joist 110. Support joists 110 are located, conventionally, on two foot center lines. Once the corner 100 is located, a horizontal chalk line 120 is scribed horizontally across the surface of the roof 30 for the entire distance of 50. The solar collector panels 20 are of the type designed to be in two foot widths. An example of this type of solar collector panel is the Referenced Solar Collector Panel. Therefore, a second corner 130 is located directly in the center of a support joist 110. Vertical chalk lines 140 and 150 are scribed the distance 60 along the centers of the support joists 110. Finally, a horizontal bottom chalk line 160 is scribed as shown in FIG. 3. A highly visible outline, defined by chalk lines 120, 140, 150 and 160, strikingly appears on the tar paper covered roof 30.

Figure 4:
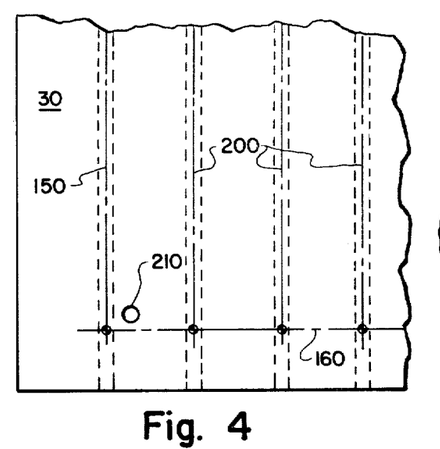
FIG. 4 sets forth the scribing of the vertical chalk lines along the center of each vertical joist.

The installer now scribes vertical chalk lines 200 down the center lines of each joist 110 between sides 140 and 150 from just above the upper chalk line 120 to the lower chalk line 160 as best shown in FIG. 4.

At this stage of installation, the tar papered covered roof 30 has been scribed with chalk to identify upper and lower horizontal lines 120 and 160 and side lines 140 and 150. In addition, the location of the center of each support joist 110 appearing within the defined boundaries are scribed by chalk lines 200.

Horizontal holes 210 and 220 are then drilled through the roof in the positions indicated in FIG. 3 to allow the fluid for the solar collector panels 20 to ingress and egress from a fluid source. These holes 210 and 220 are drilled on a horizontal plane through the roof and will be discussed subsequently.

Figure 5:
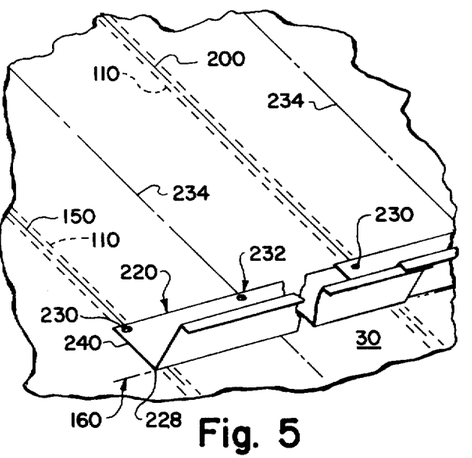
FIG. 5 is a perspective view setting forth the installation of the lower mounting brackets on the roof of the building.
Figure 6:
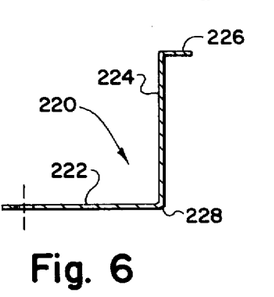
FIG. 6 is a cross-sectional view of the upper and lower mounting brackets.

The next step in installation of the solar panels 20 with the apparatus 10 of the present invention is the alignment of the lower mounting bracket 220 as shown in FIG. 5. The lower mounting bracket 220, as shown in FIG. 6, is an angle bracket having a flat surface 222, a vertical upstanding surface 224, and an outwardly extending lip 226 which is parallel to the flat surface 222. The mounting bracket 220 has, for its preferable embodiment, the following dimensions: the width of surface 222 is five inches, the height of surface 224 is four inches and the length 226 extends outwardly one half inch and overall longitudinal length of 10 feet 6 inches, a 3 inch overlap exists on each end. The juncture 228 between surfaces 222 and 224 is aligned over the lower chalk line 160 as shown in FIG. 5. The outwardly extending lip 226 of the lower mounting bracket 220 is oriented to extend downwardly. A first plurality of affixation holes are formed on surface 222 so that the holes 230 align wth the chalk scribed lines, 150, 200, or 140. In other words, the juncture 228 is aligned to the horizontal bottom chalk line 160 and the bracket 220 is then positioned longitudinally along line 160 so that the first plurality of formed affixation holes 230 align with the vertical chalk lines 150, 200, and 140. A second plurality of affixation holes 232 are further provided in line with the first plurality of affixation holes 230 and are oriented to be formed over the center lines 234 between the support joists 110. It is to be understood that the center lines 234 are not scribed upon the roof.

The lower support bracket 220 is thereupon nailed or otherwise attached through affixation holes 230 and 232 to the roof 30. The nails entering affixation holes 230, of course, enter through the roof and into the support joists 110 while the nails through affixation holes 232 do not enter into support joists. The lower support bracket 220 is now firmly attached to the roof 30 being secured to the support joists 110. As shown in FIG. 5, the ends 240 of adjacent lower support brackets 220 overlap the support joist 110 by, in the preferred embodiment, 3 inches. Thus, as shown in FIG. 5, an adjoining support bracket can be mounted to the roof in an overlapping fashion.

Figure 7:
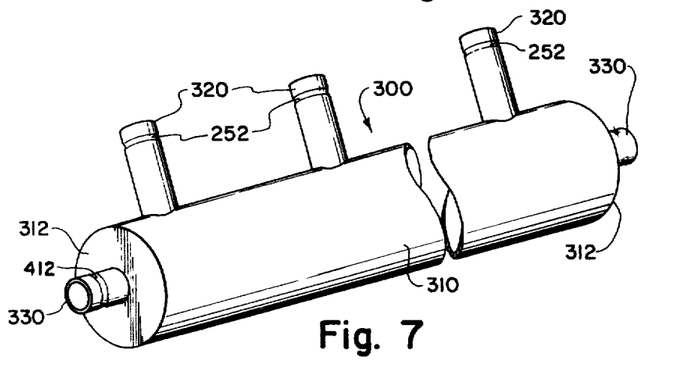
FIG. 7 is a perspective view of the manifold of the present invention.

A manifold for collecting the fluid flowing through the collector panels 20 and for extending the fluid to adjacent collector panels 20 is shown in FIG. 7 to have a main cylindrical body 310 with closed ends 312. In the preferred embodiment, the manifold 300 is 1 inch in diameter and nine foot 11¾ inches long. The manifold shown in FIG. 7 has fiberglass insulation wrapped around it so that it is approximately 4 inches in diameter. The manifold 300 in the preferred embodiment has five outwardly extending male ports 320 positioned along a longitudinal line extending the length of the main body 310. The outwardly extending male ports 320 are positioned one from the other at two foot intervals. Located on each closed end 312 of the main cylindrical body 310 are opposing and extending male ports 330 which are oriented directly along the axis of the manifold 300.

Figure 8:
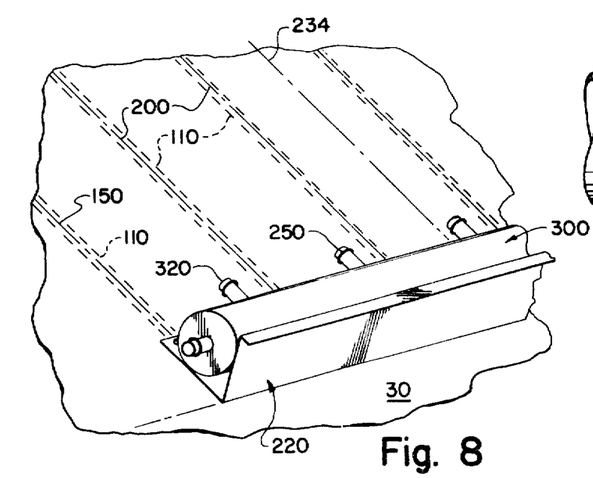
FIG. 8 is a perspective view showing the installation of the manifold on the lower mounting bracket.

In the next step of installation, the manifold 300 is placed on the installed lower mounting bracket 220. Each outwardly extending male port 320 is positioned directly over an affixation hole 232 (not over affixation holes 230). In this fashion, the manifold is placed in the mounting bracket 220 and the outwardly extending male ports 320 are oriented directly over the second plurality of holes 232. This places the male ports 320 over the center lines 234. Sealing O-rings 250 are placed in the grooved slots 252 found on each of the outwardly extending ports 320. The manifold is twisted so that the outwardly extending male ports 320 are parallel to the roof surface 30 and upwardly extending.

Figure 9:
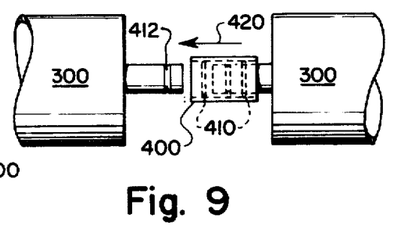
FIG. 9 is a side planar view illustrating the coupling between the opposing ends of adjacent manifolds.

The manifold 300 is of modular configuration and is designed to expand in longitudinal lengths to an adajcent manifold through use of sleeve connections 400 as best shown in FIG. 9. The sleeve connection 400 contains two O-rings 410 mounted on the interior of the sleeve 400 and in the fashion as indicated in FIG. 9, is slid in the direction of arrow 420 so that the O-rings positively seat on each axially extending male port 330. When the sleeve seats around the groove, the two adjacent manifolds are in fluid communication with each other.

Figure 10:
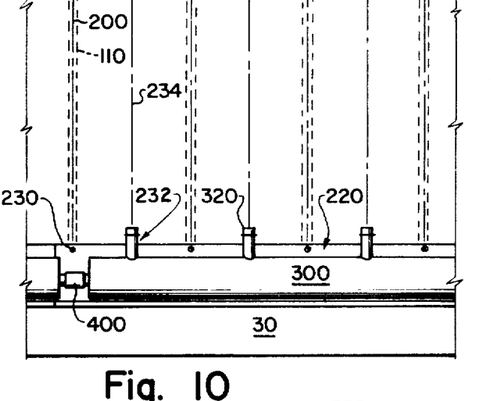
FIG. 10 sets forth the orientation of the manifold ports to the center lines between the joists of the building.

FIG. 10 illustrates the orientation of the lower mounting bracket 220 in overlapping engagement with an adjacent mounting bracket, the positioning of the first plurality of affixation holes 230 over the scribed chalk lines 200 which corresponds to the center lines of the support joists 110 and the placement of the lower manifold 300, also in engagement with an adjacent manifold by means by sleeve 400, wherein the outwardly extending male ports 320 are aligned over the second plurality of affixation holes 234 which correspond to the center lines 234 between the support joists 110.

Figure 11:
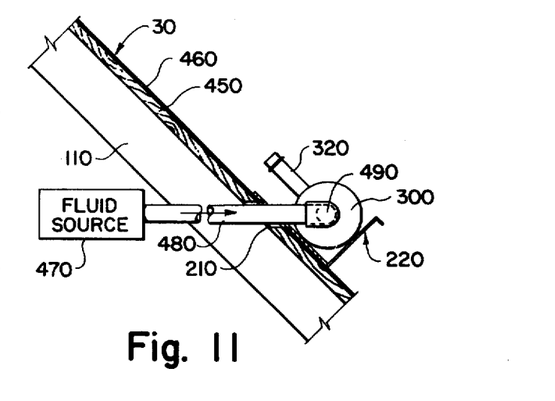
FIG. 11 is a partial sectional view illustrating the installation of an input port through the roof.

FIG. 11 illustrates the technique in which fluid can be extended into the manifold from under the roof 30. The roof 30 is conventionally comprised of plywood 450 mounted to the support joists 110 and covered by tar paper 460. A horizontal hole 210 is drilled through the roof 30 and a pipe 480 is suitably passed through the hole 210 and coupled to the manifold 300 by means of a L-joint 490. The pipe 480 is conventionally interconnected with a fluid source 470.

Figures 12, 14:
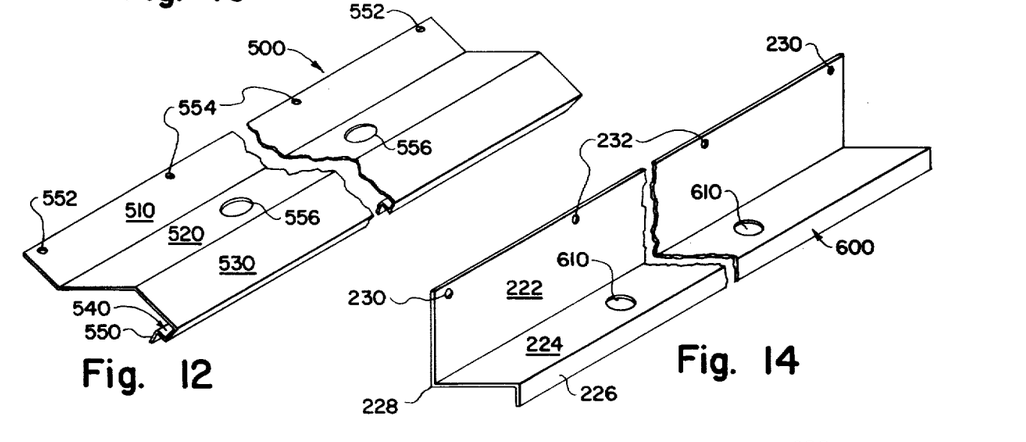
FIG. 12 is a perspective view of the lower manifold cover plate.
FIG. 14 is a perspective view of the upper support bracket.
Figure 13:
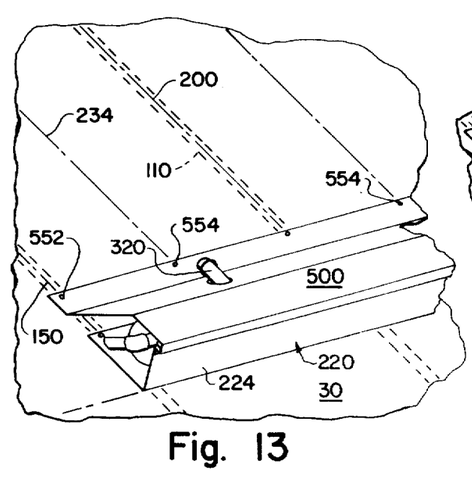
FIG. 13 is a perspective view illustrating the installation of the lower manifold cover plate over the manifold and engaging the lower support bracket.

A cover plate 500 is now placed over the manifold 300-lower mounting bracket 220 assembly as shown in FIG. 13. The cover plate 500, as shown in FIG. 12, includes a first flat surface 510 which is mounted to be flush to the surface of the roof 30. Angularly extending upwardly from surface 510 is a second surface 520 which is integral with a third surface 530 that is parallel to surface 510 and which terminates in a reverse U-shaped channel 540 having a downwardly extending lip 550. Preferred dimensions:

Surface 510 = 5 inches
Surface 520 = 5 inches
Surface 530 = 3½ inches

The cover plate 500 has a first plurality of affixation holes 552 on the first surface 510 which correspond in location to the scribed vertical chalk lines 150, 200, and 140. Therefore, in installation of the lower manifold cover plate 500, the plate 500 is placed over the lip 226 of the lower mounting bracket 220 so that the channel 540 engages the lip 226. The first plurality of affixation holes 552 are aligned with the scribed chalk lines 150, 200, or 140. A second plurality of affixation holes 554 are aligned to correspond to the center lines 234 between the support joists 110. Also located on the cener lines 234 but formed on the second surface 520 are a third plurality of holes 556. This third set of holes 556 are arranged to be engaged by the outwardly extending male ports 320 from the manifold 300 as best shown in FIG. 13. Once the lower manifold cover plate 500 has been installed so that the lip 226 of the lower mounting bracket 220 positively engages the U-shaped channel 540 of the cover plate 500, and the first plurality of affixation holes 552 are positively aligned over the scribed chalk lines, the lower manifold cover plate 500 is nailed to the support joists and to the plywood 450. The second plurality of affixation holes 554 are aligned with the center lines 234 between the support joists 110 enabling a second set of nails to be inserted into the plywood 450.

What has been described is a lower support system for solar collector panels wherein modular components can be rapidly expanded to embrace a variety of lengths. Furthermore, while a manifold of male port design has been disclosed, it is to be understood that a variety of other conventional couplers or connectors could have been, likewise, used.

The lower mounting bracket 220, the manifold 300, and the cover plate 500 forming a lower modular support system have now been installed on the roof 30.

Figure 15:
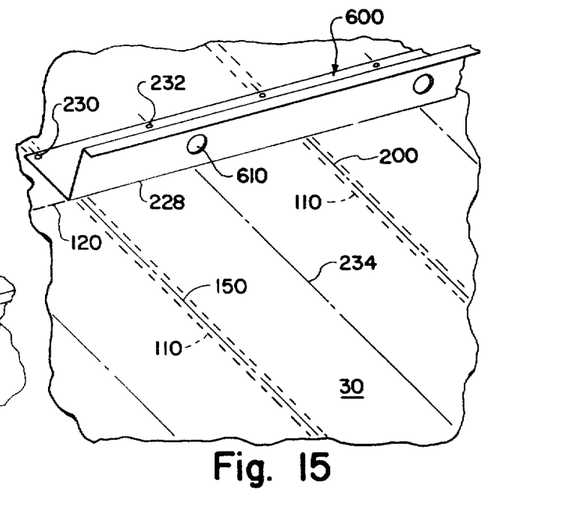
FIG. 15 is a perspective view illustrating the installation of the upper support bracket to the support joists of the roof.

In FIG. 14, is shown the upper mounting bracket 600 which corresponds in shape to the lower mounting bracket 220 shown in FIG. 6 but for the addition of a third plurality of holes 610 which are oriented directly above the second plurality of holes and are formed on surface 224. Wherever possible, numerical designations as shown in FIG. 14 will be preserved. The upper mounting bracket 600 is shown, in FIG. 15, with its lower edge 228 aligned along the upper horizontal chalk line 120. The first plurality of affixation holes 230 are then aligned with the vertical scribed lines 150, 200, or 140. When in proper orientation with chalk line 120 and alignment with vertical chalk lines 150, 200, and 140, nails are driven through affixation holes 230 firmly affixing the upper mounting bracket 600 to the support joists 110 and to the plywood 450. Nails are further driven through affixation holes 232 to the plywood 450.

Figure 16:
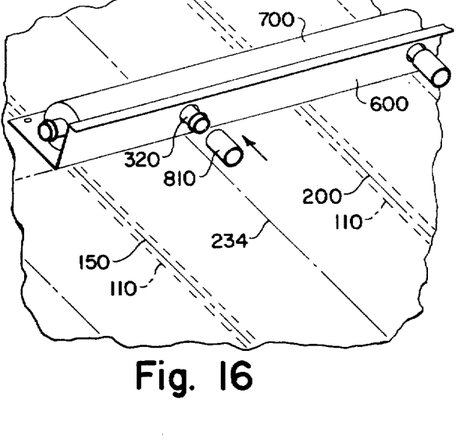
FIG. 16 is a perspective view illustrating the installation of the upper manifold and the sleeves onto the ports of the upper manifold.
Figure 17:
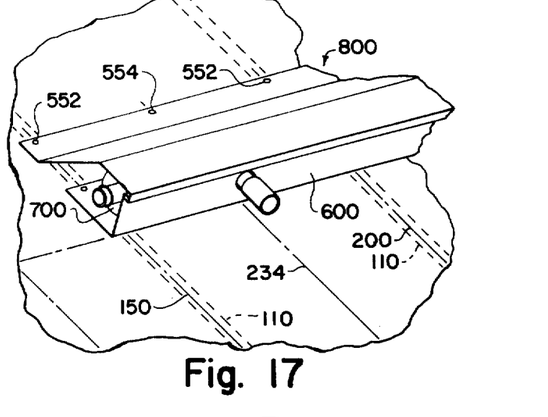
FIG. 17 is a perspective illustration setting forth the installation of the upper manifold cover plate to the support joists.

An upper manifold 700, identically corresponding to the lower manifold in shape and configuration, is thereupon placed in the upper support bracket 600 as shown in FIG. 16. The outwardly extending male ports 220 pass through the formed holes 610 of the upper mounting bracket 600 and are aligned to be over the center lines 234 between the support joists 110.

At upper manifold cover plate 800 corresponds identically in shape and configuration to the lower manifold cover plate 500 shown in FIG. 12 (but for the lack of the formed holes 556) is thereupon placed over the manifold 700 and the upper mounting bracket 600 so that the U-shaped channel 540 engages the outwardly extending lip 226 of the bracket 600. The upper manifold cover plate is thereupon affixed to the roof in the same fashion as was the lower manifold cover plate 500.

A sleeve connector 810 is now placed over each downwardly extending male port 320 from the upper manifold 600 as best shown in FIG. 16. The sleeve connector has two grooved slots at opposing ends which are receptive of O-ring seals on the male ports. The insertion of the sleeve connector 810 over the male port 320 basically forms a female receptacle.

The above describes an upper support system for a plurality of stacked, in rows, solar collector panels having the modular components, adaptable to any horizontal length, of an upper mounting bracket 600, an upper manifold 700 and an upper cover plate 800.

Figure 18:
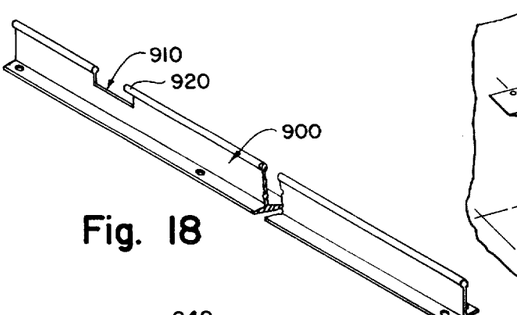
FIG. 18 is a perspective view of a center rail.
Figure 19:
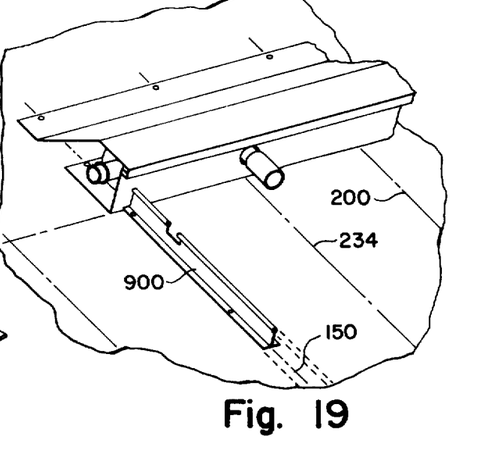
FIG. 19 is a perspective view setting forth the installation of the center rail to the upper support bracket over the support joists.

A rail 900 is now installed between the upper and lower brackets directly over the vertical chalk line 150, 200 and 140. The use of rails 900 are positively set forth in the Referenced Solar Collector Panels. The installation of the rails over the scribed chalk lines 150, 200 or 140 is illustrated in FIG. 19. The rail 900 shown in FIG. 18 has been improved over that set forth in the Referenced Solar Collector Panels in that a cutout 910 is provided having an overhanging hook 920. The purpose of this cutout 910 will be elaborated on later.

Figure 20:
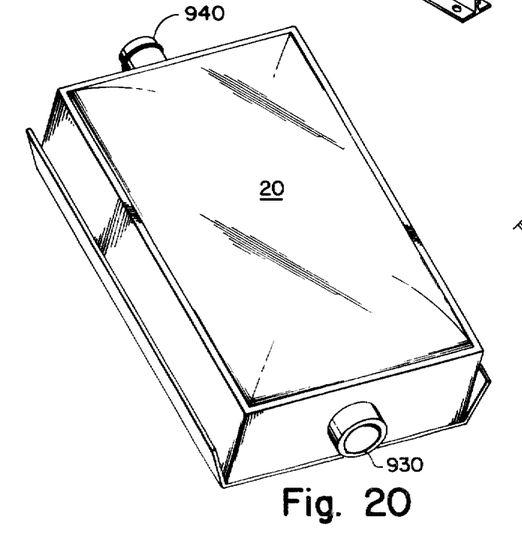
FIG. 20 is a perspective view of a solar collector panel.
Figure 21:
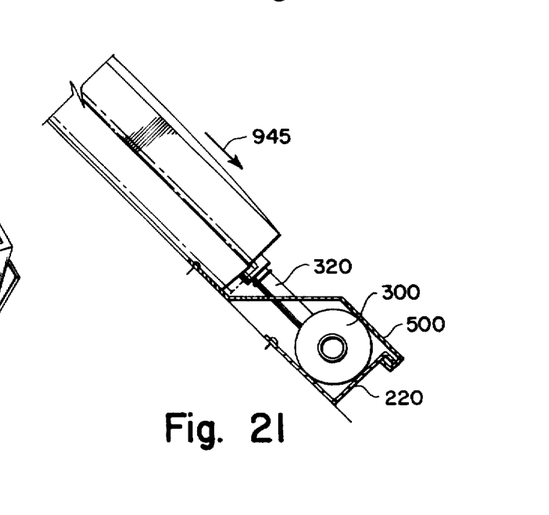
FIG. 21 is a side planar view in partial cross-section illustrating the insertion of the solar collector panels to the lower manifold.

In FIG. 20 is shown the Referenced Solar Collector Panel 20. A female port 930 is posited on one end of the panel 20 while a male port 940 exists on the other end. The lowermost solar panel 20 is slid in the direction of arrow 945, as shown in FIG. 21, to positively engage the male port 320 of the lower manifold 300. The female port 930 positively seats over the opening on the male port 320 to place the solar panel 220 in fluid communication with the manifold 300.

Figure 22:
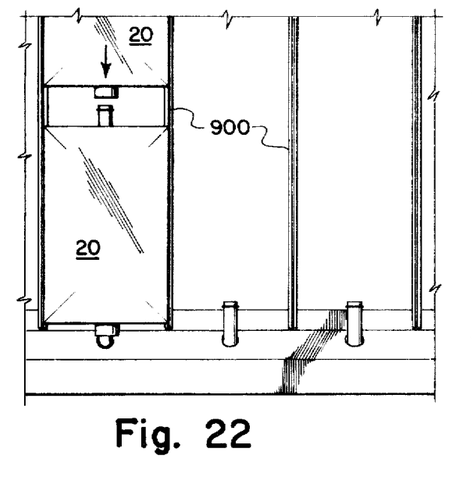
FIG. 22 is a top planar view illustrating the installation of the solar collector panels to each other between the vertical rails.
Figure 23:
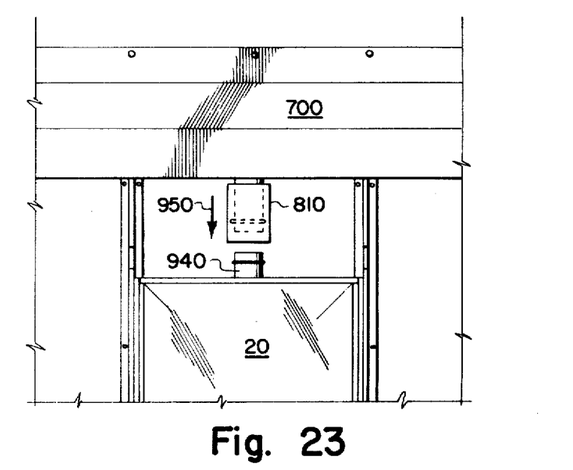
FIG. 23 is a top planar view showing the installation of the last solar collector panel to the upper manifold.

In this fashion, all of the solar collector panels 20 can be slid between the rails 900 as shown in FIG. 22. When all of the solar panels 20 have been inserted, the sleeve 810 is slid downwardly in the direction of arrow 950 to engage the male port 940 of the uppermost solar collector panel 20. In this fashion, the solar collector panels 20 are now interconnected to the upper manifold 600.

Figure 24:
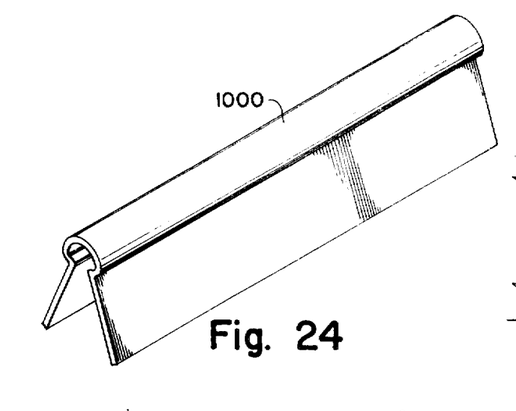
FIG. 24 is a perspective view of the seal lock of the present invention.
Figure 25:
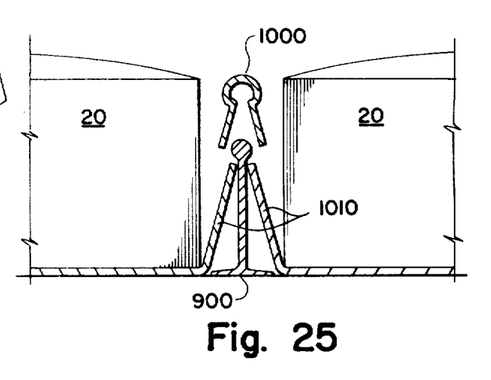
FIG. 25 is a cross-sectional view of the engagement of the seal lock to the center vertical rail.

The seal lock 1000 also disclosed in the Referenced Solar Collector Panel is shown in FIG. 24, which engages the upwardly extending flanges 1010 from the solar panels 20 to the rail 900. The engagement of the seal lock 1000 to the upstanding flanges 1010 and the rail 900 form a water tight seal.

Figures 26, 27:
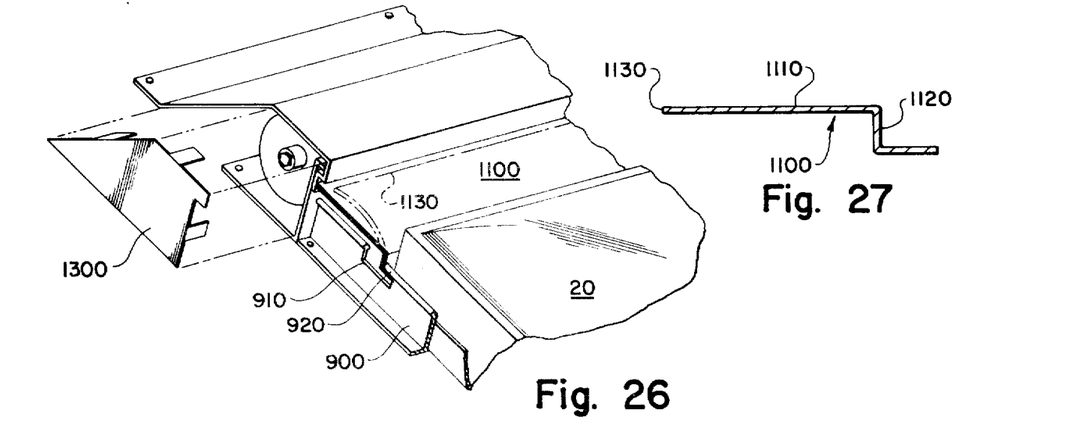
FIG. 26 is a partial perspective view illustrating the installation of a seal plate between the upper bracket and a solar collector panel.
FIG. 27 is a cross-sectional view of the seal plate of FIG. 26.
Figure 28:
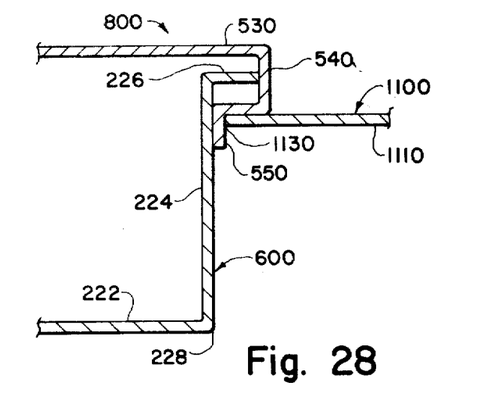
FIG. 28 is a cross-sectional view of the seal plate, the bracket, and the cover plate, all in engagement.

A seal plate 1110 is then inserted over the sleeves 810 in the upper portion of the solar panels 20 as best shown in FIG. 26. The seal plate comprises a first elongated flat surface 1110 having an L-shaped channel 1120 extending downwardly therefrom as shown in FIG. 27. The L-shaped channel 1120 is inserted under the hook 920 of each rail 900 and the opposing end 1130 is slightly bent as shown by the dotted line in FIG. 26 and positioned under the U-shaped channel 540 to abut the downwardly extending lip 550 of the upper manifold cover plate 600, the cover plate 800, and the seal plate 1100, is shown in FIG. 28.

Side cover plates 1300 are then installed, as shown in FIG. 26 to seal the sides of the upper and lower support systems from the environment. The side cover plates are formed to correspond to the configuration defined by the edges of the cover plate, the bracket, and the roof.

Figure 29:
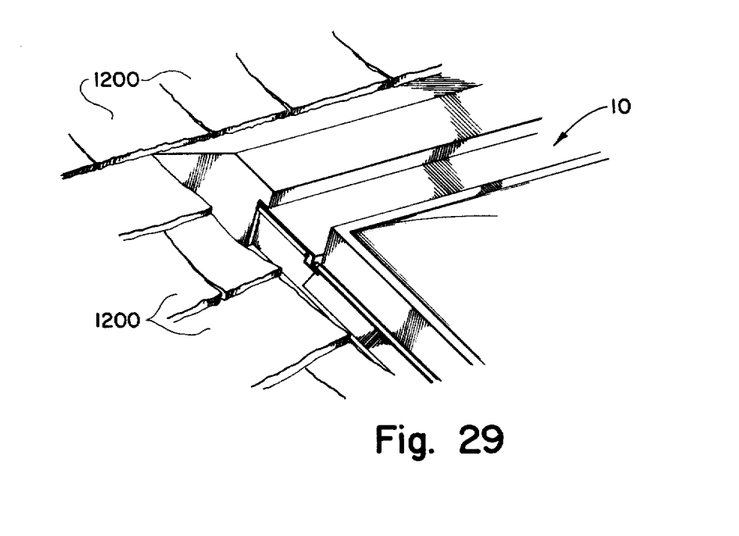
FIG. 29 is a partial perspective view illustrating the installation of the solar collector panels as part of the roof.

The solar collector panels installed by the method and apparatus of the present invention is shown in FIG. 29 to be part of the roofing material 1200 of the roof 30. The complete the installation of the solar collector panels, the upper manifold is interconnected with the fluid source 470 and the remaining open ports 330 (one on the upper and one on the lower manifolds) are sealed. It is clear that the upper and lower support brackets, seal plates, and cover plates can be modified to any horizontal length, in multiples of joist distances, by cutting. The manifolds can, likewise, be modified by cutting a section from one end of the main body portion to form the desired length. The result is a minimum set of components for manufacturing and for inventory purposes, a set of components that can be modified for any type of roof installation.

It is to be understood, and as witnessed by the claims attached hereto, that a novel method for installing solar collector panels is disclosed involving the scribing with chalk of the tar paper on a roof with alignment lines so that upper and lower support systems can be readily installed with a minimum training of the installation crew. Furthermore, a system for using modular installation components adaptable to different horizontal lengths is disclosed.

Although the present invention has been described with a certain degree of particularity, it is understood that the present disclosure has been made by way of example and that changes in details of structure may be made without departing from the spirit thereof.

We claim:

1. A method for installing solar collector panels as part of the roof of a building, said roof having vertical roof joists spaced at predetermined distances, said method comprising the steps of:
    scribing chalk lines on the roof, the chalk lines being located to define the center of each vertical roof joist and to define the upper and lower horizontal ends of the panels,
    affixing a lower support bracket aligned along the lower chalk line through the roof to the joists,
    affixing an upper support bracket aligned along the upper chalk line through the roof to the joists,
    affixing a center rail between the upper and lower support brackets along each vertical chalk line through the roof to the joists, and
    installing a plurality of collector panels between the vertical rails, the collector panels engaging the upper and lower support brackets.

2. A method for installing solar collector panels as an integral part of the roofing material of the roof of a building said roof being formed from plywood over joists spaced at predetermined distances and said plywood being covered with tar paper, said method comprising the steps of:
    scribing chalk lines on the tar paper, the chalk lines being located to define the center of each vertical joist and to define the upper and lower horizontal ends of the panels,
    placing a lower support system having formed nail holes spaced at intervals corresponding to said predetermined distances between said vertical roof joists aligned along the lower chalk line,
    aligning the holes of the lower support system with the vertical chalk lines,
    affixing the lower support system through the aforesaid holes and tar paper to the plywood and joists,
    placing an upper support system having formed nail holes spaced at intervals corresponding to said predetermined distances between said vertical roof joists aligned along the upper chalk line,
    aligning the holes of the upper support system with the vertical chalk lines,
    affixing the upper support system through the aforesaid holes and tar paper to the plywood and joists,
    installing a center rail between the upper and lower support systems along each vertical chalk line by nailing the center rail through the roof to the joists,
    installing one or a plurality of collector panels between the center rails, said collector panels engaging the upper and lower support systems, and
    installing roofing material around said installed solar panels on said tar paper to the plywood.

3. A method for installing solar collector panels as part of the roof of a building, said roof having vertical roof joists spaced at predetermined distances, said method comprising the steps of:
    scribing chalk lines on the roof, the chalk lines being located to define the center of each vertical roof joist and to define the upper and lower horizontal ends of the panels,
    installing a lower bracket having formed nail holes spaced at intervals corresponding to said predetermined distances between said vertical roof joists aligned along the lower chalk line, with said nail holes oriented over the vertical chalk lines, by nailing the lower bracket through the holes and through the roof to the joists,
    placing a lower manifold having manifold ports spaced at intervals corresponding to said predetermined distances between said vertical roof joists on the lower bracket so that said manifold ports of the lower manifolds are extending upwardly and are aligned at the center between the vertical chalk lines,
    installing a lower manifold cover over the lower manifold, having formed nail holes spaced at intervals corresponding to said predetermined distances between said vertical roof joists with said nail holes of the lower manifold cover oriented over the vertical chalk lines, by nailing the lower manifold cover through the aforesaid holes and through the roof to the joists,
    installing an upper bracket having formed nail holes spaced at intervals corresponding to said predetermined distances between said vertical roof joists aligned along the upper chalk line, with said nail holes of the upper bracket oriented over the vertical chalk lines, by nailing the upper bracket through the aforesaid holes and through the roof to the joists,
    placing an upper manifold on the upper bracket having manifold ports spaced at intervals corresponding to said predetermined distances between said vertical roof joists so that said manifold ports of the upper manifold are extending downwardly and are aligned at the center between the vertical chalk lines, installing an upper manifold cover having formed nail holes spaced at intervals corresponding to said predetermined distances between said vertical roof joists over the upper manifold, with said nail holes of the upper manifold cover oriented over the vertical chalk lines, by nailing the upper manifold cover through the aforesaid holes and through the roof to the joists, installing a center rail between the upper and lower brackets along each vertical chalk line by nailing the center rail through the roof to the joists, inserting a plurality of collector panels between the vertical rails, the collector panels engaging the ports of the upper and lower manifolds, and inserting a seal plate between the upper mounting bracket and the uppermost collector panel over the upper manifold ports.

4. A method for installing solar collector panels as part of the roof of a building, said roof having vertical roof joists spaced at predetermined distances, said method comprising the steps of:

scribing chalk lines on the roof, the chalk lines being located to define the center of each vertical roof joist and to define the upper and lower horizontal ends of the panels, placing a lower support system having formed nail holes spaced at intervals corresponding to said predetermined distances between said vertical roof joists aligned along the lower chalk line, aligning the holes of the lower support systems with the vertical chalk lines, affixing the lower support system through the aforesaid holes and through the roof to the joists, placing an upper support system having formed nail holes spaced at intervals corresponding to said predetermined distances between said vertical roof joists aligned along the upper chalk line, aligning the holes of the upper support system with the vertical chalk lines, affixing the upper support system through the aforesaid holes and through the roof to the joists, and installing one or a plurality of collector panels between the vertical chalk lines, said collector panels engaging the upper and lower support system.

5. A method for installing solar collector panels as part of the roofing material of the roof of a building said roof being formed from plywood over joists spaced at predetermined distances and said plywood being covered with tar paper, said method comprising the steps of:

scribing chalk lines on the tar paper, the chalk lines being located to define the center of each vertical joist and to define the upper and lower horizontal ends of the panels, placing a lower support system having formed nail holes spaced at intervals corresponding to said predetermined distances between said vertical roof joists aligned along the lower chalk line, aligning the holes of the lower support system with the vertical chalk lines, affixing the lower support system through the aforesaid holes and tar paper to the plywood and joists, placing an upper support system having formed nail holes spaced at intervals corresponding to said predetermined distances between said vertical roof joists aligned along the upper chalk line, aligning the holes of the upper system bracket with the vertical chalk lines, affixing the upper support bracket through the aforesaid holes and tar paper to the plywood and joists, and installing one or a plurality of collector panels between the vertical chalk lines, said collector panels engaging the upper and lower support brackets.

6. A method for installing solar collector panels as an integral part of the roofing material of the roof of a building said roof being formed from plywood over joists spaced at predetermined distances and said plywood being covered with tar paper, said method comprising the steps of:

scribing chalk lines on the tar paper, the chalk lines being located to define the center of each vertical joist and to define the upper and lower horizontal ends of the panels, placing a lower support system having formed nail holes spaced at intervals corresponding to said predetermined distances between said vertical roof joists aligned along the lower chalk line, aligning the holes of the lower support system with the vertical chalk lines, affixing the lower support system through the aforesaid holes and tar paper to the plywood and joists, placing an upper support system having formed nail holes spaced at intervals corresponding to said predetermined distances between said vertical roof joists aligned along the upper chalk line, aligning the holes of the upper support system with the vertical chalk lines, affixing the upper support system through the aforesaid holes and tar paper to the plywood and joists, installing one or a plurality of collector panels between the vertical chalk lines, said collector panels engaging the upper and lower support systems, and installing roofing material around said installed solar panels on said tar paper to the plywood.

7. An apparatus for installing solar collector panels as part of the roofing material on the roof of a building, said roof being formed from tar paper covered plywood over support joists spaced at predetermined distances, said apparatus comprising:

upper and lower angle mounting brackets, each of said brackets having first and second edges, each of said brackets further having an outwardly extending lip along said first edge with a first plurality of affixation holes formed along a line near said second edge of said bracket, the aforesaid affixation holes being spaced to align with the center of said support joists of said building and with a second plurality of affixation holes formed along said line, the aforesaid holes being spaced to align with the centerline between said joists, said first edge of said upper bracket having a plurality of insertion holes formed in a line near said tip, said plurality of insertion holes being spaced to align with the center line between said joists, means engaging said first plurality of affixation holes of said mounting brackets for firmly attaching said upper and lower brackets through said tar paper and through said plywood to said support joists, each of said brackets being mounted horizontally on said roof with said first edge extending upwardly and with said lip oriented downwardly, means for attaching said upper and lower brackets through said second plurality of affixation holes to said plywood, upper and lower manifolds, each of said manifolds having a cylindrical main body portion with ports extending from opposing ends of said main body and with one or a plurality of outwardly extending ports disposed along a longitudinal line extending the length of said main body, the aforesaid ports of said upper manifold being oriented to engage through said insertion holes when said upper manifold is placed on said upper bracket, said ports of said lower manifold being oriented to align over said second plurality of affixation holes when said lower manifold is placed on said lower bracket, upper and lower manifold cover plates for mounting over said manifolds and said brackets, each of said cover plates having a first surface parallel with said roof containing a first plurality of affixation holes, the aforesaid affixation holes being spaced to align with the center of said support joists, and a second plurality of affixation holes oriented on the center lines between said joists, each of said cover plates further having a second surface angularly extending upwardly over said manifolds, the second surface of said lower cover plate having a plurality of formed insertion holes, the aforesaid insertion holes being oriented to coincide with said centerlines between said support joists and receptive of outwardly extending ports from said lower manifold, each of said cover plates having a third surface extending from said second surface and parallel to said first surface over said manifolds, said third surface being integral with an inwardly directed channel, said channel being capable of engaging said lip of said mounting bracket, said inwardly directed channel terminating in a downwardly extending flange, means engaging said first plurality of affixation holes of said cover plates for firmly attaching said upper and lower plates through said tar paper and said plywood to said support joists, each of said cover plates being mounted over said manifolds with said channels engaging said lips of said mounting brackets, means engaging said second plurality of affixation holes of said cover plates for attaching said upper and lower plates through said tar paper to said roof, a plurality of vertical rails, each of said vertical rails being mounted through the roof and to the joists between the upper and lower mounting brackets on said roof, means for coupling one or a plurality of said panels to said upper and lower manifolds between said vertical rails, and means for connecting said ports on the opposing ends to adjacent manifolds in fluid communication.

8. A modular manifold system for interconnecting a plurality of solar collector panels together in fluid communication with a fluid source on the roof of a building, said roof being supported by roof joists spaced at a predetermined distance, each of said solar collector panels having upper and lower fluid ports and means for interconnecting a plurality of said solar collector panels together in a plurality vertical rows, each of said rows containing a number of stacked solar collector panels, said manifold system comprising:

a plurality of lower manifolds, each of said lower manifolds having a plurality of connectors spaced at said predetermined distance from each other, each of said connectors being capable of engaging in fluid communication the lowermost solar collector panel in each of said rows, each of said lower manifolds further having side connectors axially extending at opposing longitudinal ends, means receptive of the side connectors of adjacent lower manifolds for coupling adjacent lower manifolds together in fluid communication with each other, means for mounting said lower manifolds on said roof to said joists said mounting means including a cover plate with a plurality of openings therein, through each of which extends one of said plurality of connectors, the connectors of said mounted lower manifold being oriented to coincide with the centerlines between said joists, a plurality of upper manifolds, each of said upper manifolds having a plurality of connectors spaced at a predetermined distance from each other, each of the aforesaid connectors being capable of engaging in fluid communication the uppermost solar collector panel in each of said rows, each of said upper manifolds further having side connectors axially extending at opposing longitudinal ends, means receptive of the side connectors of adjacent upper manifolds for coupling said adjacent upper manifolds together in fluid communication with each other, means for mounting said upper manifolds on said roof to said joists, said mounting means having a plurality of openings therein through each of which extends one of said plurality of connectors, the connectors of said mounted upper manifold being oriented to coincide with said centerlines, and means for interconnecting said upper and lower manifolds in fluid communication with said fluid source.

9. The manifold system of claim 8 further comprising:

means cooperative with said means for mounting said lower manifold for sealing said lower manifold from the environment, and means cooperative with said means for mounting said upper manifold for sealing said upper manifold from the environment.

* * * * *